US011016620B2

(12) United States Patent
Kira et al.

(10) Patent No.: US 11,016,620 B2
(45) Date of Patent: May 25, 2021

(54) TOUCHSCREEN PANEL AND METHOD OF PRODUCING THE SAME

(71) Applicant: SHARP KABUSHIKI KAISHA, Sakai (JP)

(72) Inventors: Takatoshi Kira, Sakai (JP); Mikihiro Noma, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/601,018

(22) Filed: Oct. 14, 2019

(65) Prior Publication Data

US 2020/0125214 A1    Apr. 23, 2020

Related U.S. Application Data

(60) Provisional application No. 62/748,269, filed on Oct. 19, 2018.

(51) Int. Cl.
*G06F 3/044* (2006.01)

(52) U.S. Cl.
CPC .......... *G06F 3/0443* (2019.05); *G06F 3/0446* (2019.05); *G06F 2203/04103* (2013.01)

(58) Field of Classification Search
CPC combination set(s) only.
See application file for complete search history.

(56) References Cited

U.S. PATENT DOCUMENTS

| 2014/0290980 A1* | 10/2014 | Tang | H05K 3/465 |
| | | | 174/250 |
| 2014/0293149 A1* | 10/2014 | Tang | G06F 3/0443 |
| | | | 349/12 |
| 2015/0060252 A1* | 3/2015 | Wang | H03K 17/9622 |
| | | | 200/5 R |

FOREIGN PATENT DOCUMENTS

JP    2010-231287 A    10/2010

* cited by examiner

*Primary Examiner* — Gerald Johnson
(74) *Attorney, Agent, or Firm* — ScienBiziP, P.C.

(57) ABSTRACT

A touchscreen panel includes a substrate, a conductive layer disposed in a predetermined pattern on the substrate, and an insulating layer disposed on the conductive layer. The insulating layer includes grooves recessed in a surface of the insulating layer. The grooves include first grooves and the second grooves. The first grooves extend in a first direction. The second grooves are arranged in line in a second direction intersecting the first direction. The second grooves are recessed to the conductive layer. The first and the second grooves are filled with conductive materials. The conductive materials in the first grooves form first lines. The conductive materials in the second grooves form second lines. The first lines are configured for detection of a position of touch in the second direction. The second lines are configured for detection of a position of the touch in the first direction.

10 Claims, 10 Drawing Sheets

TOUCHSCREEN PANEL AND METHOD OF PRODUCING THE SAME

CROSS REFERENCE TO RELATED APPLICATION

This application claims priority from U.S. Provisional Patent Application No. 62/748,269 filed on Oct. 19, 2018. The entire contents of the priority application are incorporated herein by reference.

TECHNICAL FIELD

The technology described herein relates to a touchscreen panel and a method of producing the same.

BACKGROUND

Conventionally, as a touchscreen panel and a method of producing the same, a touchscreen panel and a method of producing the same described in Japanese Unexamined Patent Application Publication No. 2010-231287 have been known. It is disclosed that the touchscreen panel described in Japanese Unexamined Patent Application Publication No. 2010-231287 includes second electrode to be separated from one another by division in intersections with first electrodes on a substrate, an insulating film arranged on the first electrodes in the intersections, and a bridge line that connects the second electrodes to be separated from one another in the intersections to one another via the top of the insulating film. It is disclosed that the method of producing the touchscreen panel described in Japanese Unexamined Patent Application Publication No. 2010-231287 includes an electrode film formation process for forming the plurality of first electrodes and an electrode film having a shape separating the second electrodes from one another by division in the intersections with the first electrodes, an insulating film formation process for forming the insulating film on the first electrodes in the intersections, and a bridge line formation process for forming a bridge line that connects the second electrodes to be separated from one another in the intersections to one another via the top of the insulating film.

However, according to the method, the bridge line is disposed on respective surface sides of the second electrodes and the insulating film. Therefore, the bridge line can conceivably be visually recognized from a front surface side of the touchscreen panel. In the case, an appearance may be degraded. When the insulating film enters a gap between the electrodes to be separated from one another in the intersections, a contact resistance between portions electrically connected to each other may not be stabilized.

SUMMARY

The technology described herein has been completed based on the above-described circumstances, and an object is to provide a touchscreen panel capable of suppressing degradation of an appearance and a method of producing the same. A further object is to provide a touchscreen panel capable of stabilizing a contact resistance and a method of producing the same.

A touchscreen panel includes a substrate, a conductive layer disposed in a predetermined pattern on the substrate, and an insulating layer disposed on the conductive layer. The insulating layer includes grooves recessed in a surface of the insulating layer. The grooves include first grooves and second grooves. The first grooves extend in a first direction within a surface of the substrate. The second grooves are arranged in line in a second direction intersecting the first direction within the substrate surface. The second grooves of the grooves are recessed to the conductive layer. The grooves are filled with conductive materials. The conductive materials in the first grooves form first lines. The conductive materials in the second grooves form second lines. The first lines are configured for detection of a position of touch in the second direction. The second lines are configured for detection of a position of the touch in the first direction.

A touchscreen panel includes a substrate, a conductive layer disposed in a predetermined pattern on the substrate, an insulating layer disposed on the conductive layer, and grooves recessed in a surface of the insulating layer. The grooves include first grooves and second grooves. The first grooves extend in a first direction within a surface of the substrate. The second grooves are arranged in line in a second direction intersecting the first direction within the substrate surface. The touchscreen panel further includes first lines and second lines. The first lines are formed of conductive materials filling the first grooves and configured for detection of a position of touch in the second direction. The second lines are formed of conductive materials filling the second grooves and configured for detection of a position of the touch in the first direction. A method of producing the touchscreen panel includes a conductive layer formation step of forming the conductive layer on the substrate, a coating step of applying the insulating layer onto the conductive layer, a groove formation step of forming the grooves in the insulating layer, and a line formation step of filling the grooves with the conductive materials to form the first lines and the second lines. The groove formation step includes removing sections of the insulating layer in which the second grooves are formed to expose the conductive layer.

According to the prevent invention, there can be provided a touchscreen panel capable of suppressing degradation of an appearance and a method of producing the same. There can be provided a touchscreen panel capable of stabilizing a contact resistance and a method of producing the same.

DETAILED DESCRIPTION

First Embodiment

A first embodiment will be described with reference to FIG. 1 to FIG. 11. In the present embodiment, a touchscreen panel 5 provided in a liquid crystal panel 2 in a liquid crystal display device 1, for example, will be described. An X-axis, a Y-axis, and a Z-axis are illustrated in each of the drawings, and a lateral direction, a longitudinal direction, and a direction perpendicular to an XY plane are respectively set as an X-axis direction, a Y-axis direction, and a Z-axis direction. An upper side and a lower side in the Z-axis direction with FIG. 4 used as a reference are respectively a front surface side and a rear surface side.

Figure 1:
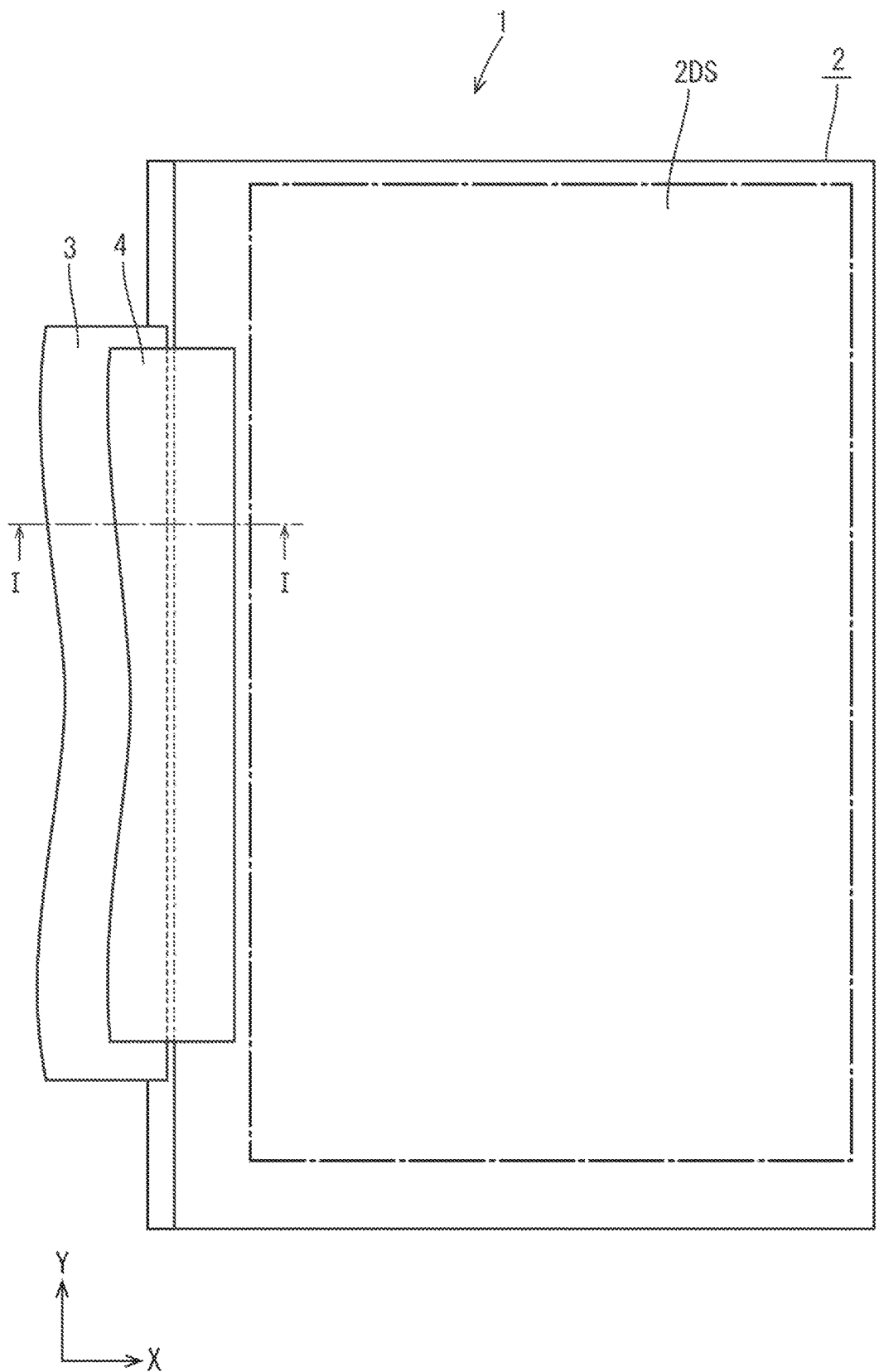
FIG. 1 is a diagram of a liquid crystal display device according to a first embodiment as viewed from a front surface side.

As illustrated in FIG. 1, the liquid crystal display device 1 includes the liquid crystal panel 2 having a rectangular shape and a plate shape, a flexible substrate for display 3 and a flexible substrate for touchscreen panel 4 connected to the liquid crystal panel 2, and a backlight device that irradiates light from a rear surface side of the liquid crystal panel 2. The liquid crystal panel 2 includes a display screen 2DS capable of displaying an image on its front surface side.

Figure 2:
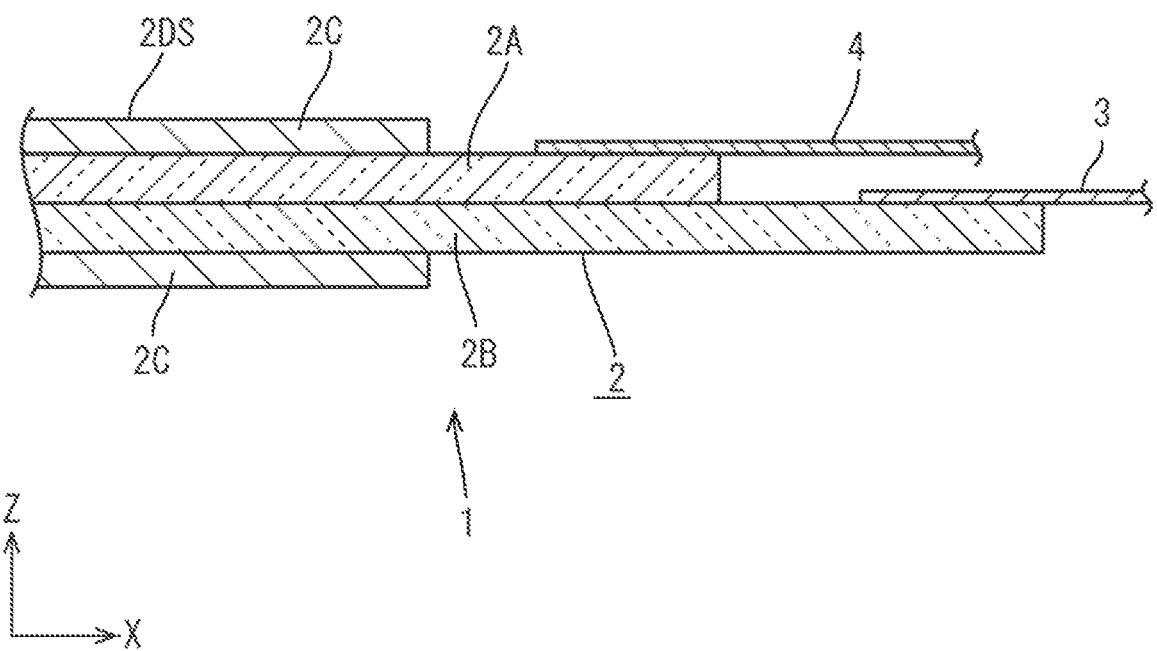
FIG. 2 is a cross-sectional view (a cross section taken along a line I-I in FIG. 1) of the liquid crystal display device.

As illustrated in FIG. 2, the liquid crystal panel 2 is configured such that paired substantially transparent substrates 2A and 2B are attached to each other with a predetermined space (cell gap) interposed therebetween while a liquid crystal is sealed between both the substrates 2A and 2B. In the pair of substrates 2A and 2B, the array substrate 2B and the CF substrate 2A are respectively disposed on the rear surface side and the front surface side. Paired front and rear polarizing plates 2C are respectively attached to outer surface sides of the paired substrates 2A and 2B. A surface of the polarizing plate 2C attached to a front surface side of the CF substrate 2A constitutes a display screen 2DS.

Figure 3:
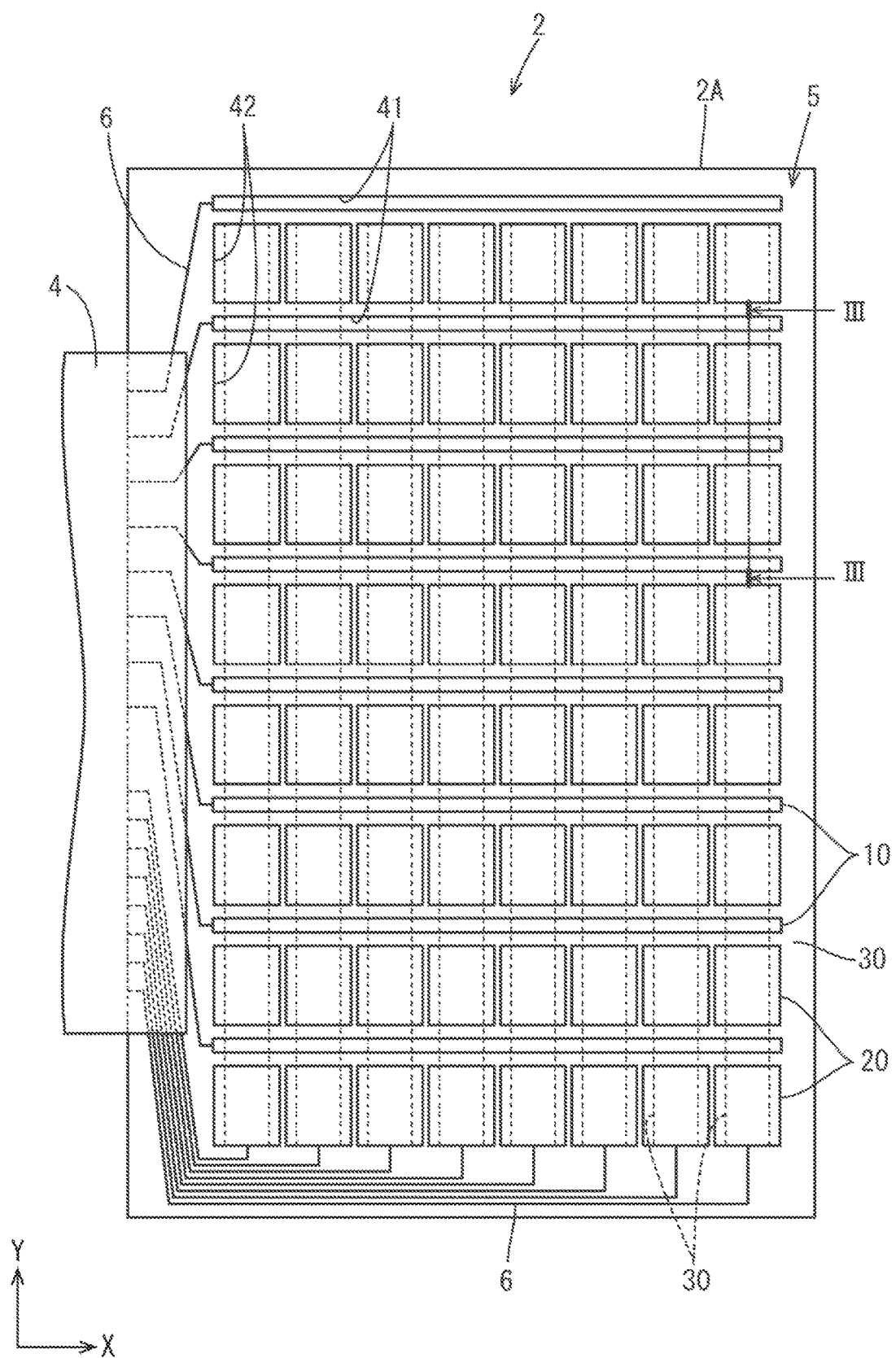
FIG. 3 is an explanatory diagram of a liquid crystal panel as viewed from the front surface side.

As illustrated in FIG. 3, the liquid crystal panel 2 includes a touchscreen panel 5 that detects a position to be touched (a touch position) by a user on the front surface side of the CF substrate 2A. The touchscreen panel 5 is of a projected capacitive type, and its detection type is a self-capacitance type. The touchscreen panel 5 includes a plurality of lines 10 and a plurality of lines 20 disposed side by side in a matrix shape within a plane of the display screen 2DS (see FIG. 1). An end of one of the lines 10 and 20 is connected to a peripheral line 6 connected to the flexible substrate for touchscreen panel 4.

The lines 10 and 20 are arranged in a form tessellating the display screen 2DS of the CF substrate 2A. The lines 10 and 20 include a plurality of first lines 10 linearly extending in the X-axis direction (first direction) within a plane of the CF substrate 2A and a plurality of second lines 20 each having a rectangular shape that is long in the Y-axis direction (second direction) perpendicular to (intersecting) the X-direction within the plane of the CF substrate 2A. It can also be said that the second lines 20 are arranged in parallel in the Y-axis direction alternately with the first lines 10.

The first line 10 and the second line 20 each have a mesh shape including thin lines formed of a metal excellent in conductivity such as copper, silver, aluminum, molybdenum, titanium, and tungsten (illustration thereof is omitted in the present embodiment). The first line 10 detects a touch position in the Y-axis direction, and the second line 20A detects a touch position in the X-axis direction.

On respective rear surface sides of the plurality of first lines 10 and the plurality of second lines 20, the conductive layer 30 having a width smaller than the width in the X-axis direction of the second lines 20 and extending in a strip shape in the Y-axis direction is disposed (indicated by a dotted line). As a material for the conductive layer 30, a conductive transparent electrode material such as a metal oxide such as ITO (indium tin oxide) or Zn (zinc oxide) or a conductive polymer such as PEDOT (poly (3, 4-ethylenedioxythiophene)) can be adopted.

Figure 4:
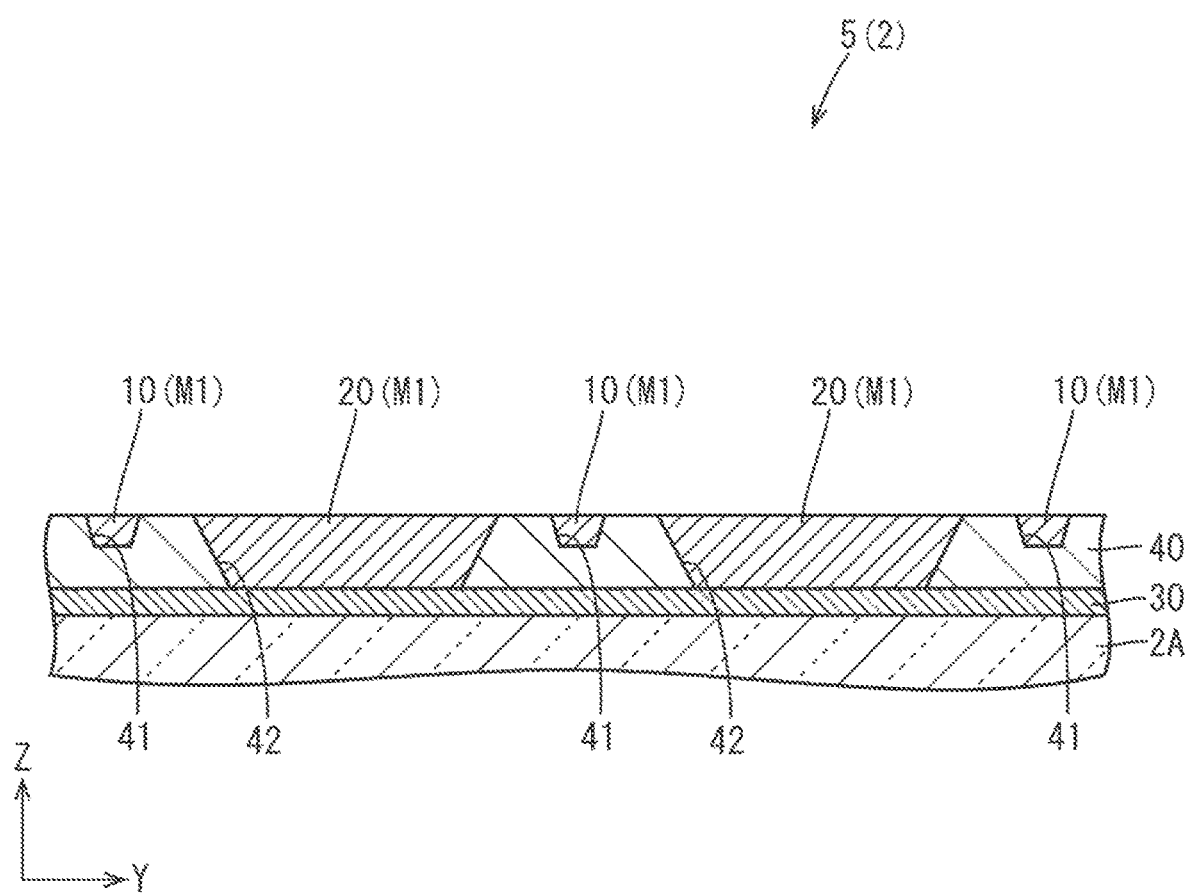
FIG. 4 is a cross-sectional view (a cross section taken along a line III-III in FIG. 3) of the liquid crystal panel.

FIG. 4 illustrates a cross section taken along a line III-III of the touchscreen panel 5 illustrated in FIG. 3. The touchscreen panel 5 includes at least the CF substrate 2A, the conductive layer 30, the insulating layer 40, the first lines 10, and the second lines 20. The conductive layer 30 extending in the Y-axis direction is disposed on a surface of the CF substrate 2A, and the insulating layer 40 is disposed on a surface of the conductive layer 30.

The insulating layer 40 is obtained by curing ultraviolet curable resin that does not conduct electricity and can be cured by irradiating ultraviolet rays (light). As a material for the insulating layer 40, (meta) acrylate-based photocurable resin, imide-based photocurable resin, a silicone-based photocurable resin, and the like can be adopted.

The insulating layer 40 is formed with grooves 41 and 42 recessed from its surface, i.e., the first grooves 41 (see FIG. 3) extending in the X-axis direction and the second grooves 42 arranged in parallel in the Y-axis direction. The first grooves 41 and the second grooves 42 are alternately disposed in the Y-axis direction, and the insulating layer 40 is formed therebetween. Each of the second grooves 42 is recessed up to the conductive layer 30. Therefore, a part of the conductive layer 30 is stripped out (exposed) in a bottom portion (a portion on the rearmost side) of the second groove 42. A bottom surface of the second groove 42 can also be said to be a part of the surface of the conductive layer 30. Each of the first grooves 41 is not recessed up to the conductive layer 30, but the insulating layer 40 is formed between the first groove 41 and the conductive layer 30.

The grooves 41 and 42 are each filled with conductive materials M1 made of metal. The conductive materials M1 filling the first grooves 41 form the first lines 10. The conductive material M1 filling the second grooves 42 form the second lines 20. Since the insulating layer 40 is disposed between the first groove 41 and the second groove 42, the first line 10 and the second line 20 are insulated from each other.

Since a part of the conductive layer 30 is exposed in the bottom portion of the second groove 42, the second line 20 formed in the second groove 42 is electrically connected to the conductive layer 30. As a result, the plurality of second lines 20 can be energized in the Y-axis direction via the conductive layer 30 on the front surface side of the CF substrate 2A and the rear surface side of the first lines 10. Accordingly, the first line 10 and the second line 20, which are insulated from each other, are formed to intersect each other in the one insulating layer 40.

Then, a method of producing the touchscreen panel 5 will be described with reference to respective cross-sectional views illustrated in FIG. 4 to FIG. 11. The method of producing the touchscreen panel 5 includes a conductive layer formation process of forming a conductive layer 30 on a CF substrate 2A, a coating process of applying an insulating layer 40 onto the conductive layer 30, a groove formation process of forming the grooves 41 and 42 in the insulating layer 40, and a line formation process of forming first lines 10 and second lines 20 by filling the grooves 41 and 42 with the conductive materials M1.

Figure 5:
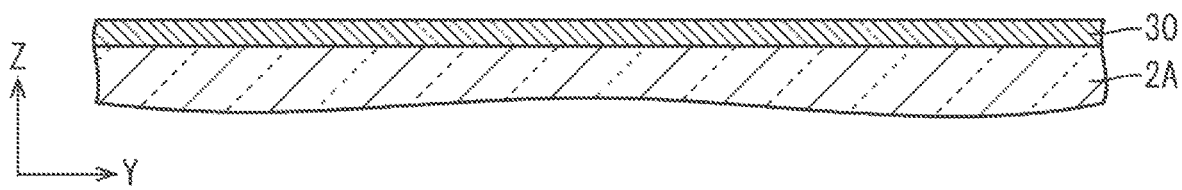
FIG. 5 is a cross-sectional view illustrating a conductive layer formation process.
Figure 6:
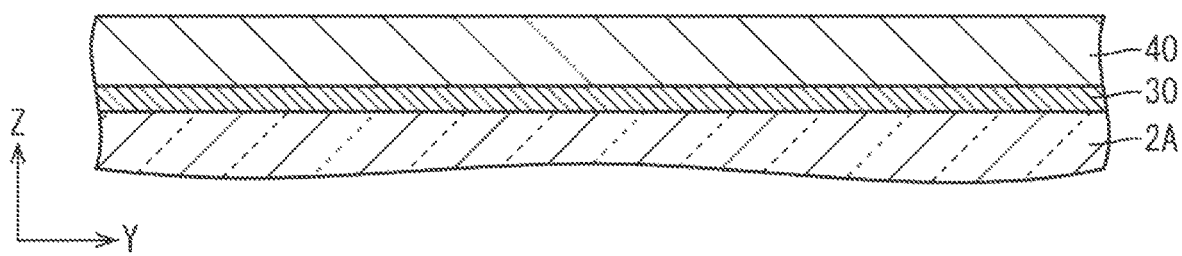
FIG. 6 is a cross-sectional view illustrating a coating process.

First, in the conductive layer formation process, the conductive layer 30 is formed in a strip shape in a Y-axis direction using a photolithography method, an inkjet method, or the like on a surface of the CF substrate 2A, as illustrated in FIG. 5. Then, in the coating process, the insulating layer 40 (ultraviolet curable resin) is applied to have a uniform film thickness onto a surface of the conductive layer 30 (on the CF substrate 2A including the conductive layer 30 when viewed on the entire substrate), as illustrated in FIG. 6. In this stage, the ultraviolet curable resin is brought into an uncured state.

Figure 7:
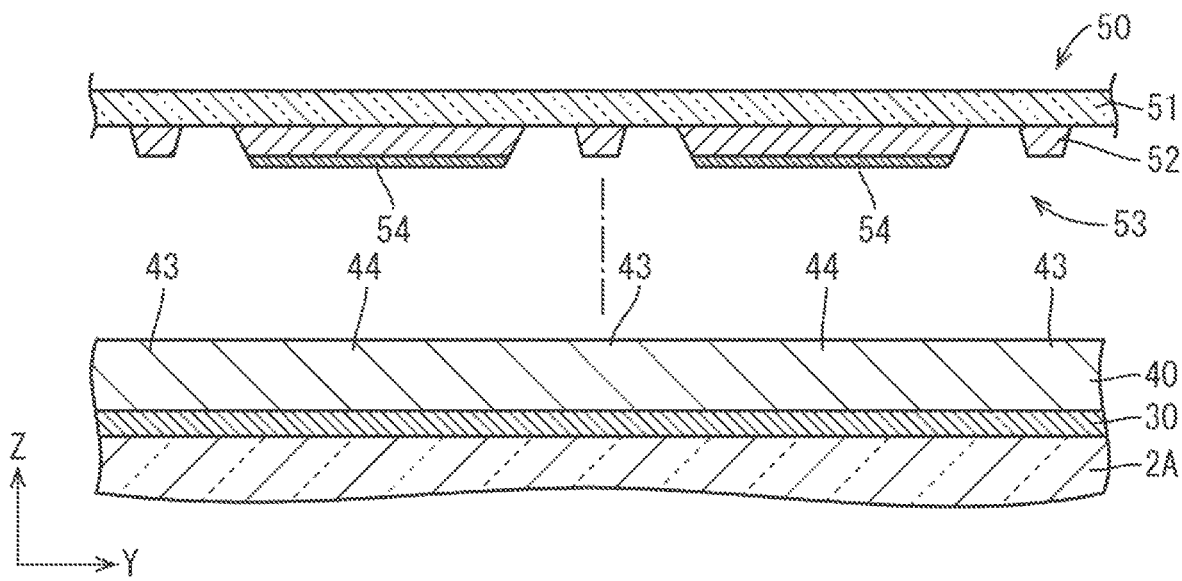
FIG. 7 is a cross-sectional view illustrating a form in which an imprint mask is disposed above in a groove formation process.

Then, the groove formation process will be described with reference to FIG. 7 to FIG. 10. As illustrated in FIG. 7, an imprint mask 50 is disposed above the insulating layer 40. The imprint mask 50 is configured to be able to come close to and press the insulating layer 40, and has an uneven concave and convex section 53 formed on the side of its surface that presses the insulating layer 40. In a convex portion as a part of the concave and convex section 53, a film-shaped light shielding section 54 that blocks ultraviolet rays is formed. The light shielding section 54 is formed at a position at which a section 44, where the second groove 42 is formed, in the insulating layer 40 is pressed (above the section 44 where the second groove 42 is formed) and on the side of a pressing surface (the lower side) in the convex portion of the concave and convex section 53.

The imprint mask 50 includes at least a base material 51 composed of glass, polycarbonate, or the like, photosensitive resin 52 disposed on the base material 51, and the metal film (light shielding section) 54 having a light shielding property disposed on the photosensitive resin 52. The imprint mask 50 is produced by gradually patterning (etching) the photosensitive resin 52 and the metal film 54 on the base material 51.

Figure 8:
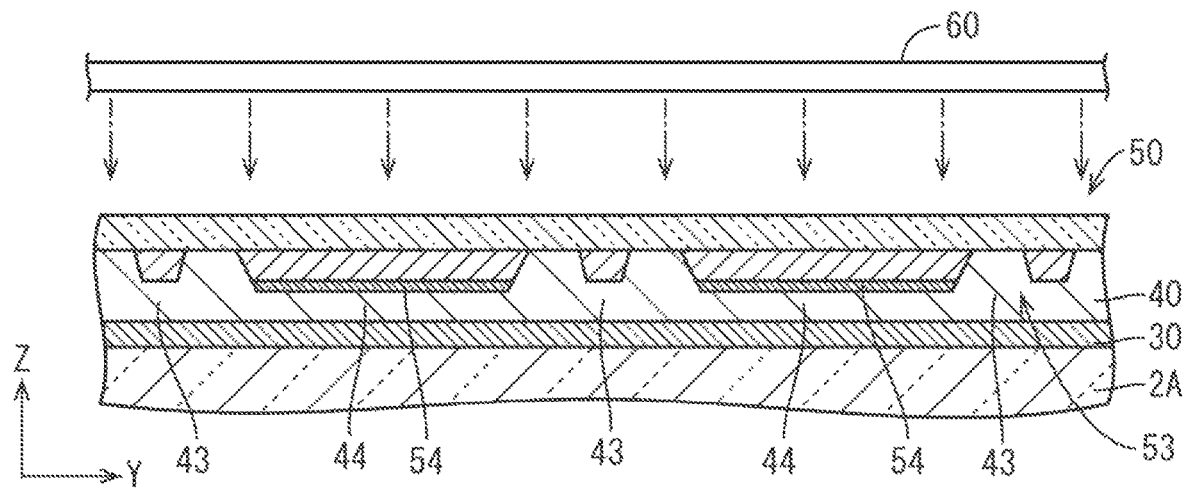
FIG. 8 is a cross-sectional view illustrating a form in which an insulating layer is pressed with the imprint mask in the groove formation process.

As illustrated in FIG. 8, the imprint mask 50 is brought close to the insulating layer 40 in an uncured state to press the insulating layer 40. Consequently, the insulating layer 40 has an uneven shape because the ultraviolet curable resin flows to follow a shape of the concave and convex section 53 in the imprint mask 50. After the imprint mask 50 is pressed until the insulating layer 40 has a predetermined thickness, a ultraviolet irradiation device 60 irradiates the insulating layer 40 with ultraviolet rays from above the imprint mask 50.

At this time, a part of the ultraviolet rays irradiated from the ultraviolet irradiation device 60 is blocked by the light shielding section 54. Consequently, a part of the insulating layer 40 positioned below the light shielding section 54, i.e., the section 44 where the second groove 42 is formed is not irradiated with ultraviolet rays, so that the ultraviolet curable resin remains uncured. On the other hand, a section 43 other than the section 44 where the second groove 42 is formed is irradiated with ultraviolet rays, so that the ultraviolet curable resin enters a cured state.

Figure 9:
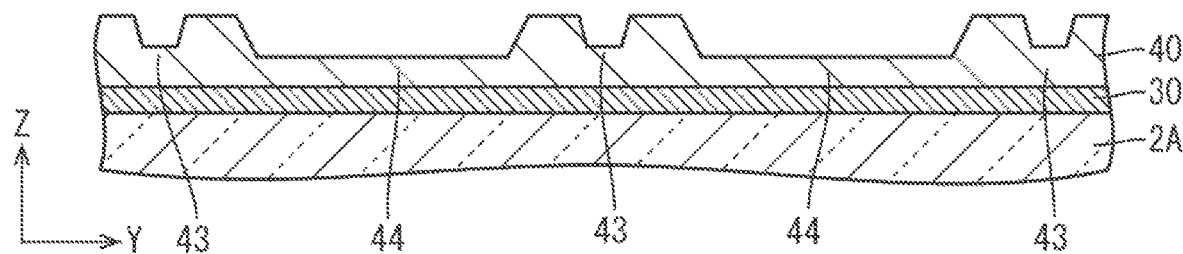
FIG. 9 is a cross-sectional view illustrating a state where the imprint mask has been stripped in the groove formation process.
Figure 10:
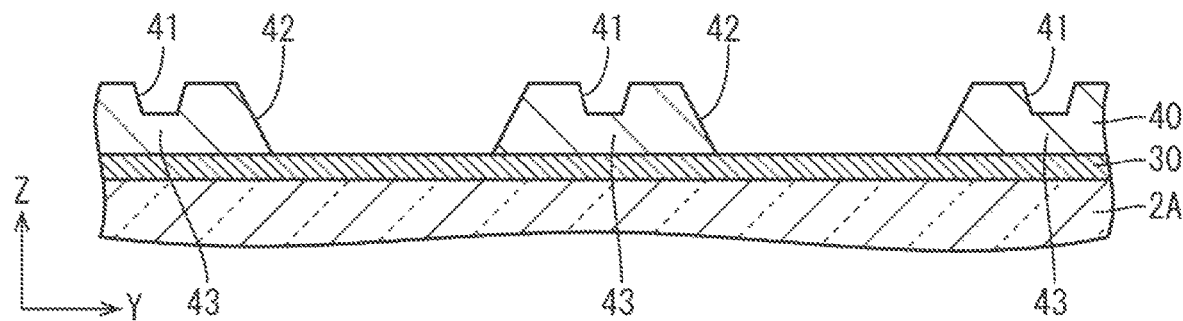
FIG. 10 is a cross-sectional view illustrating a state where the insulating layer has been cleaned in the groove formation process.

Then, when the imprint mask 50 is separated (stripped) from the insulating layer 40, a surface side of the insulating layer 40 has a shape following the shape of the concave and convex section 53, as illustrated in FIG. 9. When the insulating layer 40 is cleaned with a solvent composed of isopropyl alcohol, ethanol, or the like, the section 44 where the second groove 42 is formed is removed with the solvent. Consequently, the conductive layer 30 positioned on a rear surface side of (below) the section 44 where the second groove 42 is formed is exposed on its front surface side, as illustrated in FIG. 10. On the other hand, the section 43 other than the section 44 where the second groove 42 is formed remains cured on the conductive layer 30. The first groove 41 is formed in a groove portion formed in the section 43 other than the section 44 where the second groove 42 is formed, and the second groove 42 is formed in a groove portion to which the conductive layer 30 is exposed.

Figure 11:
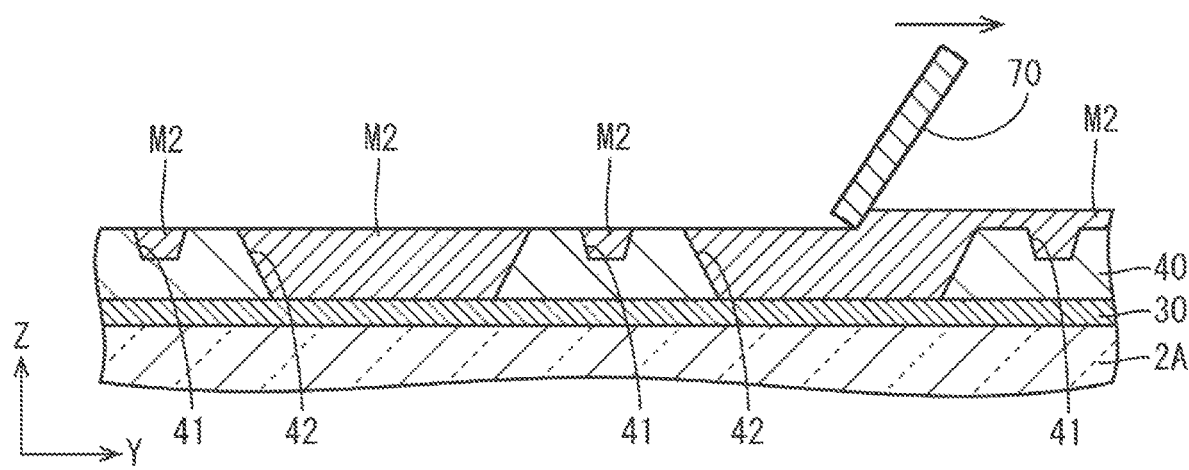
FIG. 11 is a cross-sectional view illustrating a line formation process.

Then, in the line formation process, the surface of the insulating layer 40 is coated with metal ink M2, as illustrated in FIG. 11. The metal ink M2 is obtained by melting and dispersing the conductive material M1 in a solvent composed of water, alcohol, or the like, and has predetermined fluidity. The first groove 41 and the second groove 42 are filled with the metal ink M2, or the metal ink M2 is disposed on the surface of the insulating layer 40.

Then, when a squeegee 70 is slid along the surface of the insulating layer 40, the metal ink M2 with which the first groove 41 and the second groove 42 are filled remains while the metal ink M2 on the surface of the insulating layer 40 is removed. When the solvent included in the metal ink M2 is removed by a drying device, the first line 10 and the second line 20 are respectively formed of the conductive material M1 with which the first groove 41 is filled and the conductive material M1 with which the second groove 42 is filled, as illustrated in FIG. 4.

Then, an effect of the present embodiment will be described. The touchscreen panel 5 in the present embodiment includes the CF substrate 2A, the conductive layer 30 disposed in a predetermined pattern on the CF substrate 2A, and the insulating layer 40 disposed on the conductive layer 30, and is configured such that the insulating layer 40 is formed with the grooves 41 and 42 recessed from its surface, i.e., the first grooves 41 extending in the first direction (X-axis direction) within the plane of the CF substrate 2A and the second grooves 42 arranged in parallel in the second direction (Y-direction) intersecting the first direction within the plane of the CF substrate 2A, the second grooves 42 out of the grooves 41 and 42 are each recessed up to the conductive layer 30, the grooves 41 and 42 are respectively filled with the conductive materials M1, and the first lines 10 and the second lines 20 are respectively formed of the conductive material M1 with which the first grooves 41 are filled and the conductive material M1 with which the second grooves 42 are filled, and the first lines 10 each detect a touch position in the second direction and the second lines 20 each detect a touch position in the first direction.

The touchscreen panel 5 can cause the lines to intersect one another while keeping insulation among the lines by the one insulating layer 40. The conductive layer 30 disposed on the CF substrate 2A is electrically connected to the second line 20 from a rear surface side of the insulating layer 40. Therefore, degradation of an appearance because of the conductive layer 30 being visually recognized from a front surface side of the touchscreen panel 5 can be suppressed.

A method of producing the touchscreen panel 5 in the present embodiment is a method of producing the touchscreen panel 5 including a CF substrate 2A, a conductive layer 30 disposed in a predetermined pattern on the CF substrate 2A, an insulating layer 40 disposed on the conductive layer 30, and grooves 41 and 42 recessed from a surface of the insulating layer 40, the grooves 41 and 42 including the first grooves 41 extending in a first direction (X-axis direction) within a surface of the CF substrate 2A and the second grooves 42 arranged in parallel in a second direction (Y-axis direction) intersecting the first direction within the surface of the CF substrate 2A, and further including first lines 10 that are formed of a conductive material M1 with which the first grooves 41 are filled and each detect a touch position in the second direction and second lines 20 that are formed of a conductive material M1 with which the second grooves 42 are filled and each detect a touch position in the first direction, the method including a conductive layer formation process for forming the conductive layer 30 on the CF substrate 2A, a coating process for applying the insulating layer 40 onto the conductive layer 30, a groove formation process for forming the grooves 41 and 42 in the insulating layer 40, and a line formation process for respectively filling the grooves 41 and 42 with the conductive materials M1 to form the first lines 10 and the second lines 20, in which sections 44, where the second grooves 42 are respectively formed, in the insulating layer 40 are removed, to expose the conductive layer 30 in the groove formation process.

According to the method of producing the touchscreen panel 5, the conductive layer 30 that electrically connects the second lines 20 from a rear surface side of the insulating layer 40 can be formed on a surface of the CF substrate 2A. As a result, the touchscreen panel 5 in which the conductive layer 30 is not easily visually recognized can be produced. The section 44, where the second groove 42 is formed, in the insulating layer 40 is removed to expose the conductive layer 30, and the second line 20 is formed in the second groove 42 to which the conductive layer 30 is exposed. Therefore, the lines can be made to intersect one another while being insulated from one another by the one insulating layer 40. The insulating layer 40 does not easily enter a section other than a section to be insulated so that a contact resistance is stabilized.

In the present embodiment, the insulating layer 40 is configured to be curable when irradiated with light, the section 44, where the second groove 42 is formed, in the insulating layer 40 is removed by irradiating the section 43 other than the section 44, where the second groove 42 is formed, in the insulating layer 40 with light and then cleaning the insulating layer 40 in the groove formation process. According to the method of producing the touchscreen panel 5, the section 44, where the second groove 42 is formed, in the insulating layer 40 can be easily removed. The conductive layer 30 can be exposed to the second groove 42 with high accuracy.

In the present embodiment, in the groove formation process, the insulating layer 40 is pressed with the imprint mask 50, and the insulating layer 40 is irradiated with light, to form the grooves 41 and 42, and the imprint mask 50 includes a light shielding section 54 at a position at which the section 44, where the second groove 42 is formed, in the insulating layer 40 is pressed. According to the method of producing the touchscreen panel 5, the section 43 other than the section 44, where the second groove 42 is formed, in the insulating layer 40 can be irradiated with light with high accuracy. The section 44, where the second groove 42 is formed, in the insulating layer 40 can be appropriately removed by cleaning.

Second Embodiment

A second embodiment will be described with reference to FIG. 12 to FIG. 16. The second embodiment includes a touchscreen panel 105 that differs in a configuration of a conductive layer from that in the first embodiment and a method of producing the same. In the present embodiment, the same sites as those in the above-described embodiment are respectively assigned the same reference numerals, to omit an overlapping description for a structure, a producing method, a function, and an effect.

Figure 16:
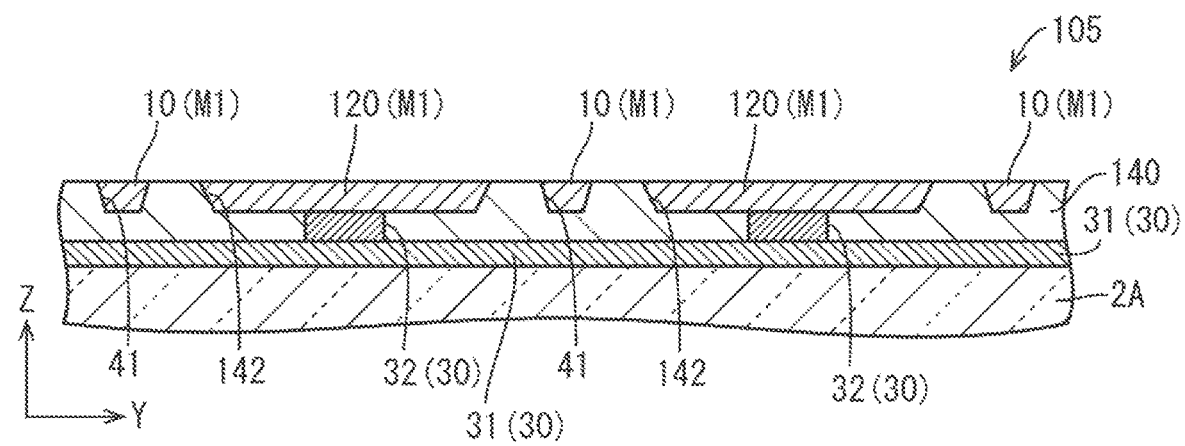
FIG. 16 is a cross-sectional view illustrating a line formation process.

FIG. 16 is a cross-sectional view of the touchscreen panel 105. A conductive layer 30 in the touchscreen panel 105 includes a main body 31 extending in a strip shape in a Y-axis direction (second direction) on a CF substrate 2A and dots 32 disposed in a dot pattern on the main body 31. The dots 32 are obtained by curing a conductive polymer having a higher viscosity than that of an insulating layer 140, and PEDOT, for example, can be adopted as a material for the dots 32.

The insulating layer 140 is not formed on the dots 32, although formed on the main body 31. Out of grooves 41 and 142, the second grooves 142 are respectively recessed up to the dots 32. Therefore, a surface of each of the dots 32 is stripped out (exposed) in a bottom portion of the second groove 142. A part of a bottom surface of the second groove 142 can also be said to be the surface of the dot 32. A second line 120 formed in the second groove 142 is electrically connected to the main body 31 via the dot 32.

Figure 12:
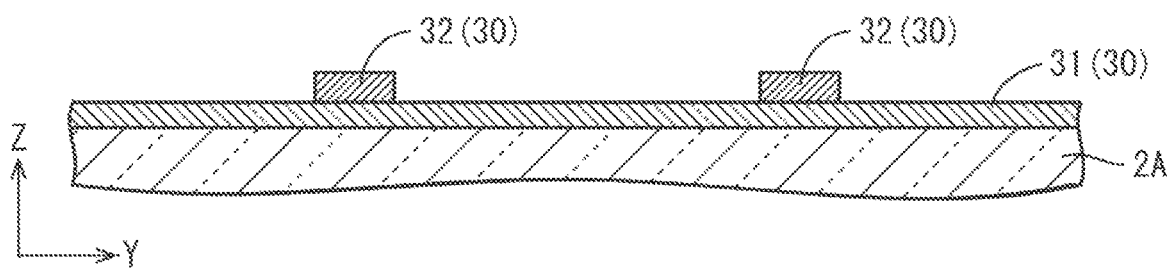
FIG. 12 is a cross-sectional view illustrating a conductive layer formation process in a second embodiment.

Then, a method of producing the touchscreen panel 105 will be described with reference to respective cross-sectional views illustrated in FIG. 12 to FIG. 16. First, in a conductive layer formation process, a main body 31 in a conductive layer 30 is formed in a strip shape in a Y-axis direction on a surface of a CF substrate 2A, as illustrated in FIG. 12. Then, on the strip-shaped main body 31, a plurality of dots 32 are formed in a dot pattern with a predetermined spacing using a photolithography method, an ink jet method, or the like. At this time, a position at which each of the dots 32 is formed is just below a section 144, where a second groove 142 is formed, in an insulating layer 140 in a groove formation process, described below.

Figure 13:
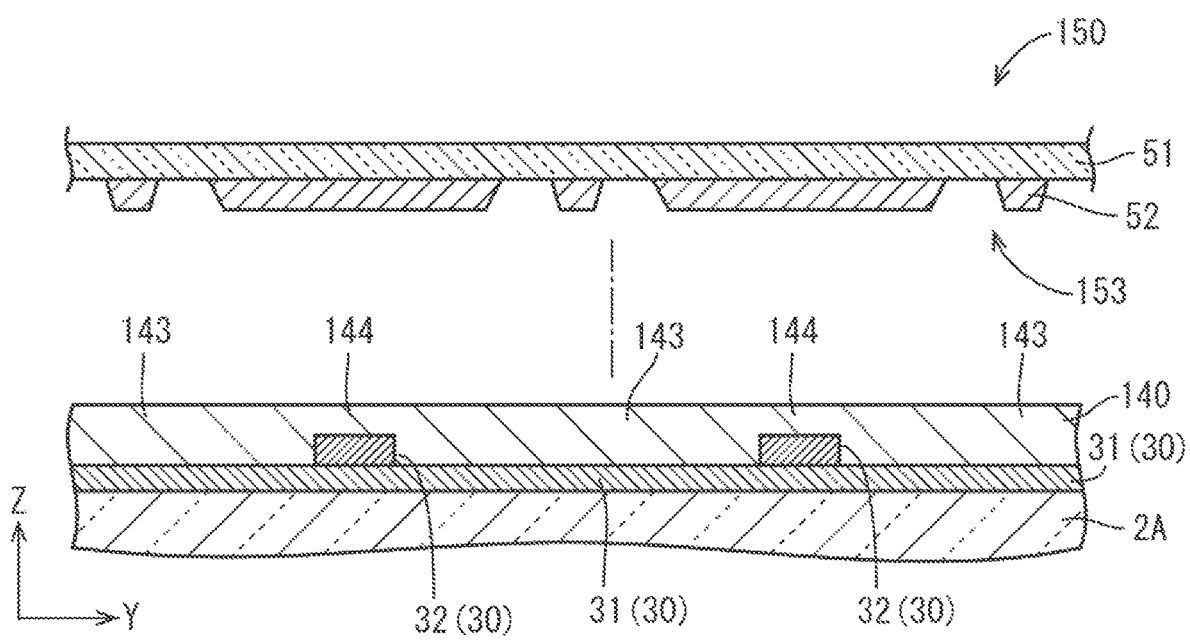
FIG. 13 is a cross-sectional view illustrating a coating process and the groove formation process.

Then, in a coating process, the insulating layer 140 (ultraviolet curable resin) is applied to have a uniform film thickness onto respective surfaces of the main body 31 and the dots 32 in the conductive layer 30 (the CF substrate 2A including the main body 31 and the dots 32 when viewed on the entire substrate), as illustrated in FIG. 13. Then, in a groove formation process, an imprint mask 150 is disposed above the insulating layer 140. In the present embodiment, the imprint mask 150 is not provided with a light shielding section.

Figure 14:
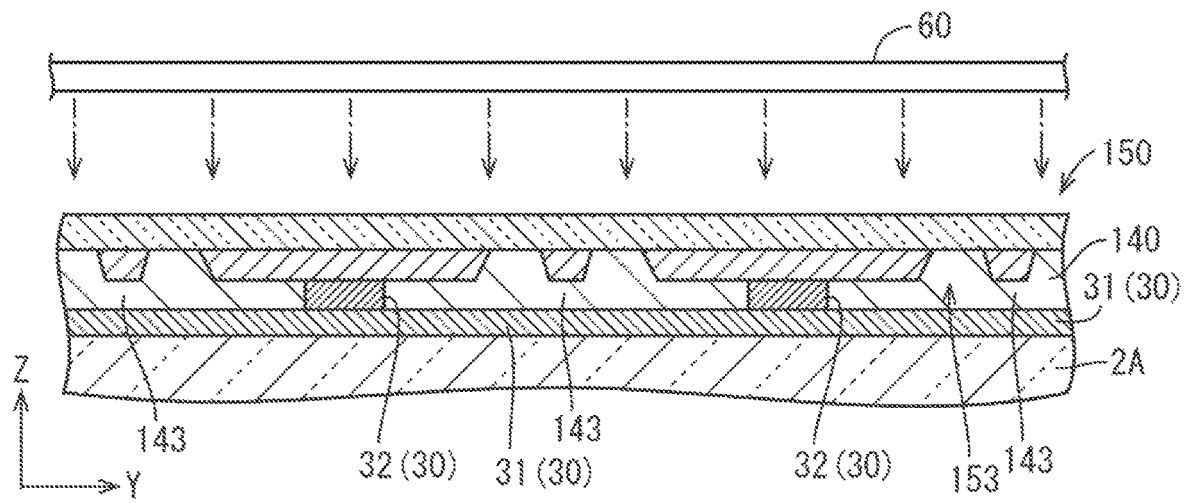
FIG. 14 is a cross-sectional view illustrating a form in which an insulating layer is pressed with an imprint mask in the groove formation process.

As illustrated in FIG. 14, the imprint mask 150 is brought close to the insulating layer 140 in an uncured state to press the insulating layer 140. Consequently, the insulating layer 140 has an uneven shape because the ultraviolet curable resin flows to follow a shape of a concave and convex section 153 in the imprint mask 150.

Until the section 144 (see FIG. 13), where the second groove 142 is formed, in the insulating layer 140 disposed above (on a surface of) the dot 32 flows toward the side of the dot 32 (until there is no section 144 above the dot 32), the imprint mask 150 presses the insulating layer 140. Pressure for the imprint mask 150 to press the insulating layer 140 at this time is desirably 10 to 30 N/cm.

Figure 15:
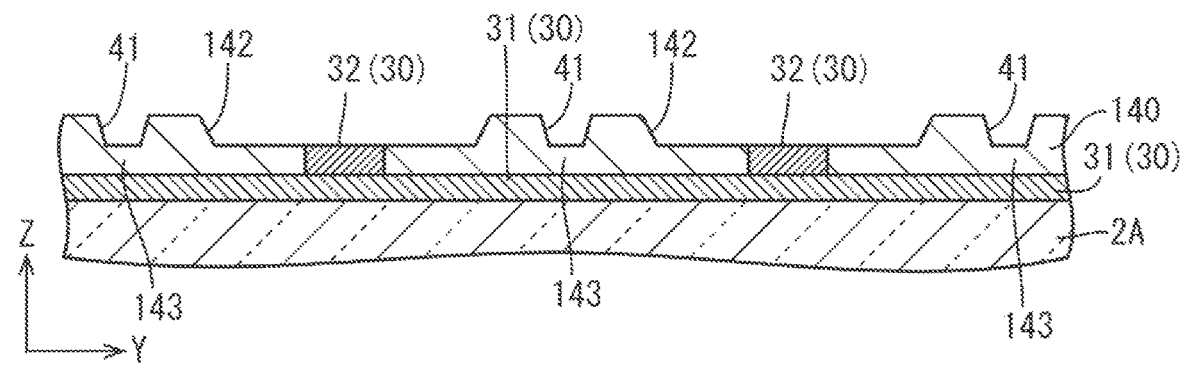
FIG. 15 is a cross-sectional view illustrating a state where the imprint mask has been stripped in the groove formation process.

Then, when a ultraviolet irradiation device 60 irradiates the insulating layer 140 with ultraviolet rays, to separate the imprint mask 150 from the insulating layer 140, a front surface side of the insulating layer 140 has a shape following the shape of the concave and convex section 153, as illustrated in FIG. 15. The insulating layer 140 is cleaned, to expose the dot 32 to the second groove 42.

When metal ink is applied to a surface of the insulating layer 140 and is squeezed, and a solvent included in the metal ink is then removed, first lines 10 and second lines 120 are respectively formed of a conductive material M1 with which the first grooves 41 are filled and a conductive material M1 with which the second grooves 142 are filled, as illustrated in FIG. 16.

Then, an effect of the present embodiment will be described. In the touchscreen panel 105 in the present embodiment, the conductive layer 30 includes the main body 31 extending in the second direction (Y-axis direction) on the CF substrate 2A and the dots 32 disposed in a dot pattern on the main body 31, and the second grooves 142 out of the grooves 41 and 142 are respectively recessed up to the dots 32. According to the touchscreen panel 105, the second lines 120 respectively formed in the second grooves 142 contact the dots 32 disposed on the surface of the main body 31 extending in the second direction. Therefore, accuracy of electrical connection between the second line 120 and the dot 32 (the conductive layer 30) is improved so that a contact resistance is stabilized.

In the present embodiment, the conductive layer 30 includes the main body 31 and the dots 32. In the conductive layer formation process, the main body 31 extending in the second direction is formed on the CF substrate 2A, the dots 32 disposed in a dot pattern are each formed on the main body 31 and in the section 144 where the second groove 142 is formed. In the groove formation process, the dot 32 is exposed to the second groove 142. According to the method of producing the touchscreen panel 105, the dot 32 formed on the main body 31 is exposed to the second groove 142 in the groove formation process. Therefore, the second line 120 easily contacts the dot 32 (i.e., the conductive layer 30). As a result, a contact resistance between the second line 120 and the dot 32 (the conductive layer 30) is stabilized.

In the present embodiment, the dot 32 is composed of a conductive polymer having a higher viscosity than that of the insulating layer 140. According to the method of producing the touchscreen panel 105, the dot 32 more easily adheres to the main body 31 than the insulating layer 140. Therefore, in the groove formation process, the dot 32 (the conductive layer 30) is easily exposed to the second groove 142.

<Modification>

A modification will be described with reference to FIG. 17. In the present modification, a touchscreen panel 205 that differs in configuration of a conductive layer from that in the above-described embodiment and a method of producing the same. In the present embodiment, the same sites as those in the above-described embodiment are respectively assigned the same reference numerals, to omit an overlapping description for a structure, a producing method, a function, and an effect.

Figure 17:
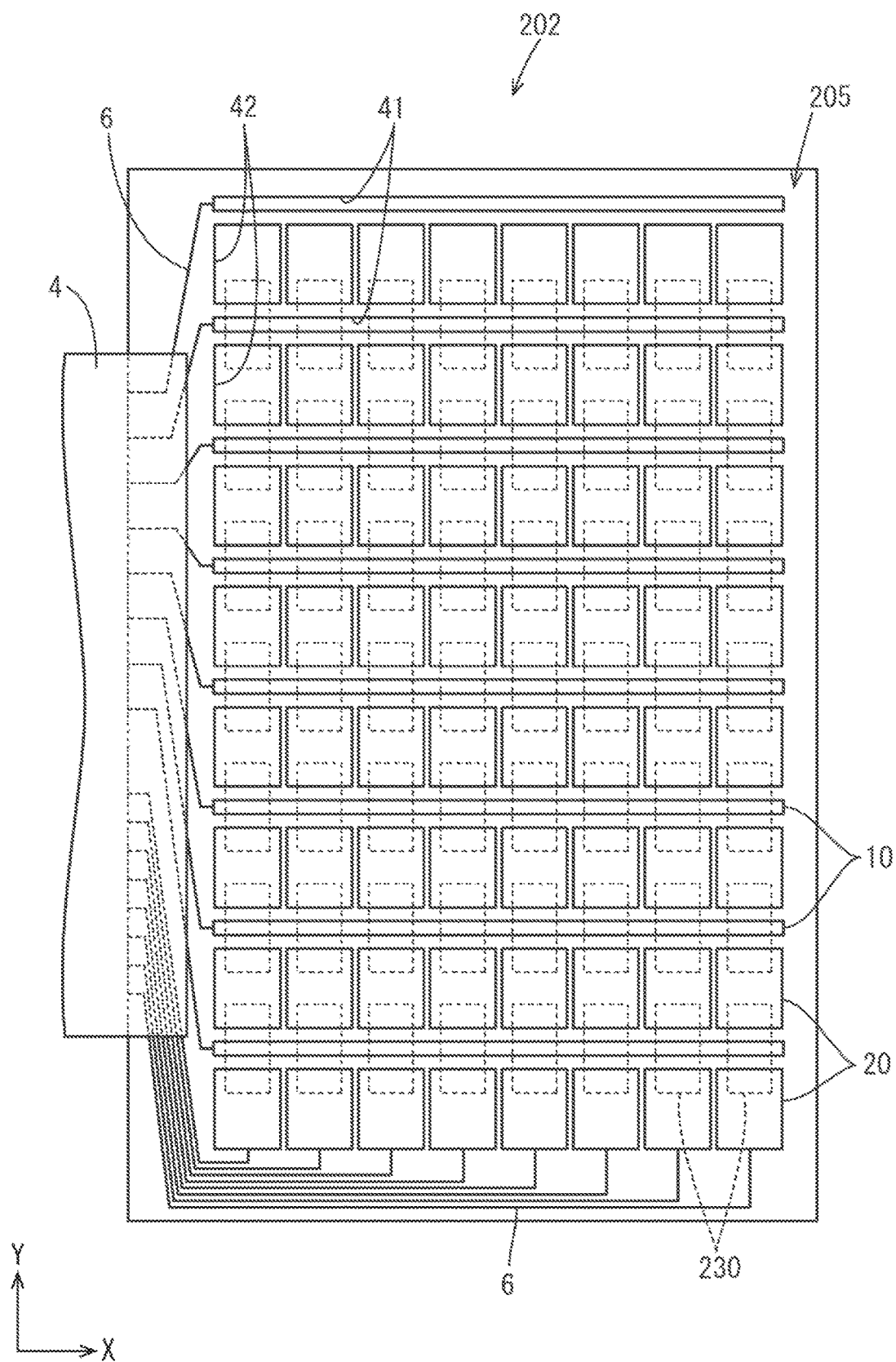
FIG. 17 is an explanatory diagram of a liquid crystal panel according to a modification as viewed from a front surface side.

FIG. 17 is a diagram illustrating the touchscreen panel 205 in a liquid crystal panel 202 as viewed from a front surface side. On a rear surface side of a plurality of first lines 10 and a plurality of second lines 20, a plurality of conductive layers (each indicated by a dotted line) 230 having a rectangular shape in a planar view in a Y-axis direction are provided side by side in the Y-axis direction (arranged in parallel in an island shape). In the one conductive layer 230, the two second lines 20 are respectively disposed on both its ends in the Y-axis direction, and the one first line 10 is disposed above its central portion in the Y-axis direction. Both the ends in the Y-axis direction of the one conductive layer 230 are respectively electrically connected to the two second lines 20. The one second line 20 is formed up to a CF substrate between the two conductive layers 230.

In the method of producing the touchscreen panel 205, in a conductive layer formation process, conductive layers 230 are arranged in parallel in an island shape in a Y-axis direction on a surface of a CF substrate, to produce the touchscreen panel 205.

OTHER EMBODIMENTS

The technology described herein is not limited to the embodiments described by the above-described description and drawings, but embodiments, described below, for example, are included in the scope of the technology described herein. Further, the technology described herein is not limited to the following, but can be implemented with various changes without departing from the scope and spirit thereof.

(1) Although the first direction and the second direction are respectively the X-axis direction and the Y-axis direction within the substrate surface in the above-described embodiments, the technology described herein is not limited to this. For example, a first direction and a second direction may be respectively a Y-axis direction and an X-axis direction within a substrate surface. In this case, the X-axis direction and the Y-axis direction may be replaced with each other for a direction in which a groove and a line are formed.

(2) Although the mutual capacitance type touchscreen panel has been illustrated as an example in the above-described embodiments, the technology described herein may also be applied to a self-capacitance type touchscreen panel.

(3) In addition to the above-described embodiments, the groove formation process can be appropriately changed. For example, a conductive layer may include a main body and a dot, an imprint mask may include a light shielding section at a position above the dot, and the dot may be exposed to a second groove by pressing an insulating layer with the imprint mask, irradiating the insulating layer with light, and then removing the insulating layer above the dot by cleaning in a groove formation process. According to the producing method, the dot is preferably exposed to the second groove.

(4) Although the shape of the first line is set to a linear shape, and the shape of the second line is set to a rectangular shape in a planar view in the above-described embodiments, the technology described herein is not limited to this. For example, respective shapes of a first line and a second line may be a polygon such as a rhombus, a circle, or a pentagon in a planar view.

The invention claimed is:

1. A touchscreen panel comprising:
   a substrate;
   a conductive layer disposed in a predetermined pattern on the substrate;
   an insulating layer disposed on the conductive layer;

first grooves recessed in a surface of the insulating layer and extending in a first direction and arranged in a second direction intersecting the first direction within a surface of the substrate;

second grooves arranged in line in the second direction within the surface of the substrate, the second grooves being recessed to the conductive layer;

first lines that are portions of conductive materials and disposed in the first grooves, respectively; and second lines that are portions of the conductive material and disposed in the second grooves, respectively, and the second lines being in contact with the conductive layer.

2. The touchscreen panel according to claim 1, wherein the conductive layer comprises:
   a main body extending in the second direction on the substrate; and
   dot portions disposed on and connected to the main body and disposed below and connected to the second lines, respectively.

3. The touchscreen panel according to claim 1, wherein the second grooves have a rectangular plan view shape and are arranged in the first direction and the second direction and the second lines include second conductive material portions disposed in the second grooves, respectively, and
the first lines and the second conductive material portions are arranged alternately in the second direction.

4. The touchscreen panel according to claim 3, wherein the conductive layer includes rectangular conductive portions that are elongated in the second direction,
elongated end portions of each of the rectangular conductive portions overlap two of the second lines that are arranged adjacent to each other in the second direction, and
a middle portion of each of the rectangular conductive portions overlaps one of the first lines that is disposed between the two of the second lines.

5. The touchscreen panel according to claim 4, each of the rectangular conductive portions electrically connects the two of the second lines via the elongated end portions.

6. The touchscreen panel according to claim 1, wherein the insulating layer is made of (meta) acrylate-based photocurable resin, imide-based photocurable resin, or silicone-based photocurable resin.

7. The touchscreen panel according to claim 1, wherein the first lines are not in contact with the conductive layer.

8. The touchscreen panel according to claim 1, wherein the first lines are for detecting a position of touch in the second direction and the second lines are for detecting a position of the touch in the first direction.

9. The touchscreen panel according to claim 7, wherein the second lines have a same thickness as the insulating layer and are thicker than the first lines.

10. The touchscreen panel according to claim 1, wherein the conductive layer includes elongated conductive portions extending in the second direction and arranged in the first direction, and
the second lines disposed in the second grooves arranged in line in the second direction overlap one of the elongated conductive portions.

* * * * *